Figure 1:
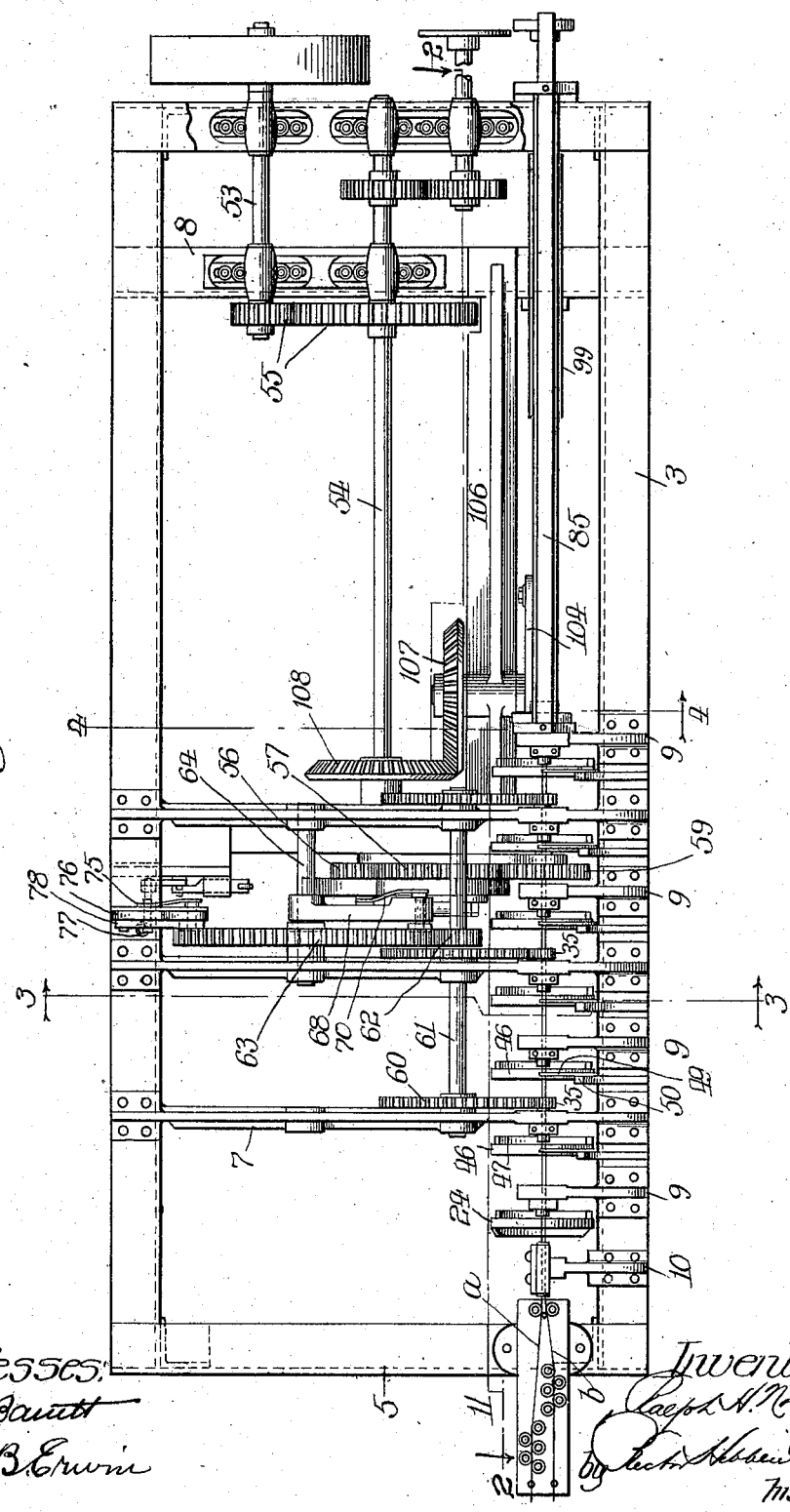

No. 881,611. PATENTED MAR. 10, 1908.
R. H. NORTON.
MACHINE FOR MAKING TWISTED WIRE BOX STRAPPING.
APPLICATION FILED OCT. 9, 1906.

8 SHEETS—SHEET 1.

No. 881,611. PATENTED MAR. 10, 1908.
R. H. NORTON.
MACHINE FOR MAKING TWISTED WIRE BOX STRAPPING.
APPLICATION FILED OCT. 9, 1906.
8 SHEETS—SHEET 2.
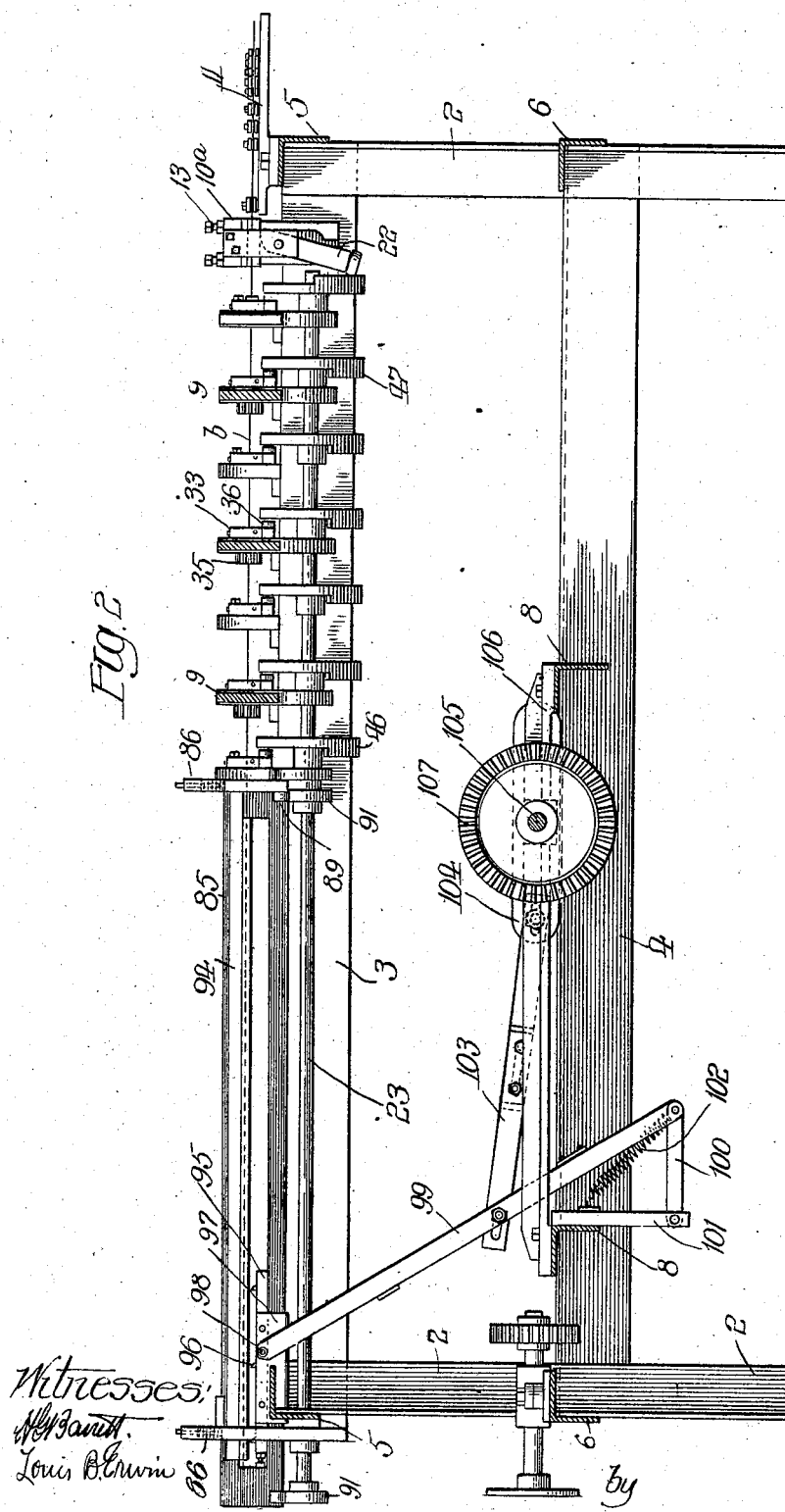
Fig. 2.

No. 881,611. PATENTED MAR. 10, 1908.
R. H. NORTON.
MACHINE FOR MAKING TWISTED WIRE BOX STRAPPING.
APPLICATION FILED OCT. 9, 1906.

8 SHEETS—SHEET 3.

Witnesses:
N. G. Barrett
Louis B. Erwin

Inventor:
Ralph H. Norton
by Rector, Hibben & Davis
his Attys

No. 881,611. PATENTED MAR. 10, 1908.
R. H. NORTON.
MACHINE FOR MAKING TWISTED WIRE BOX STRAPPING.
APPLICATION FILED OCT. 9, 1906.
8 SHEETS—SHEET 4.
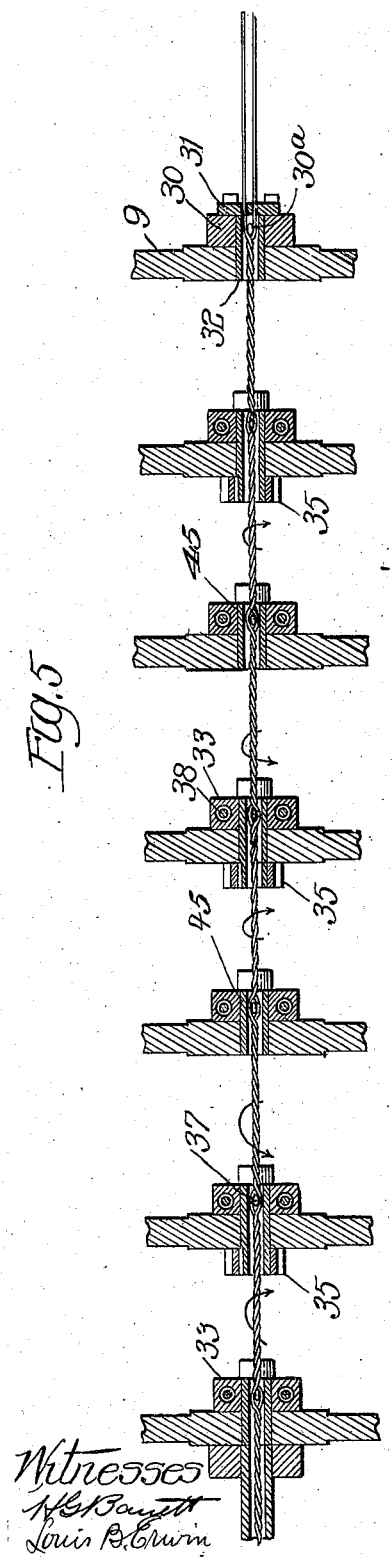
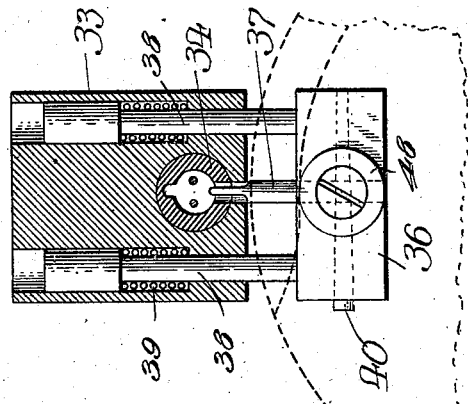
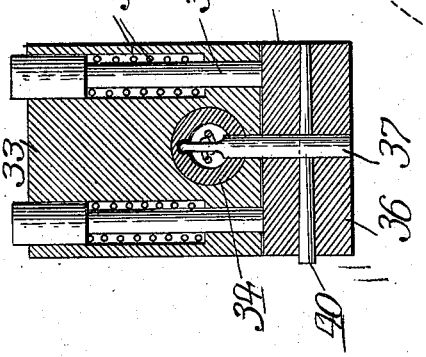
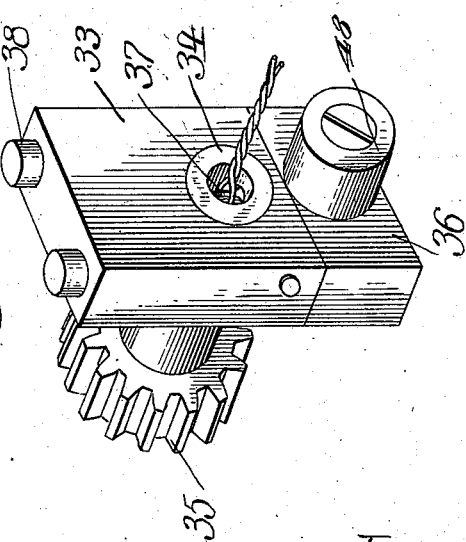

No. 881,611. PATENTED MAR. 10, 1908.
R. H. NORTON.
MACHINE FOR MAKING TWISTED WIRE BOX STRAPPING.
APPLICATION FILED OCT. 9, 1906.
8 SHEETS—SHEET 5.
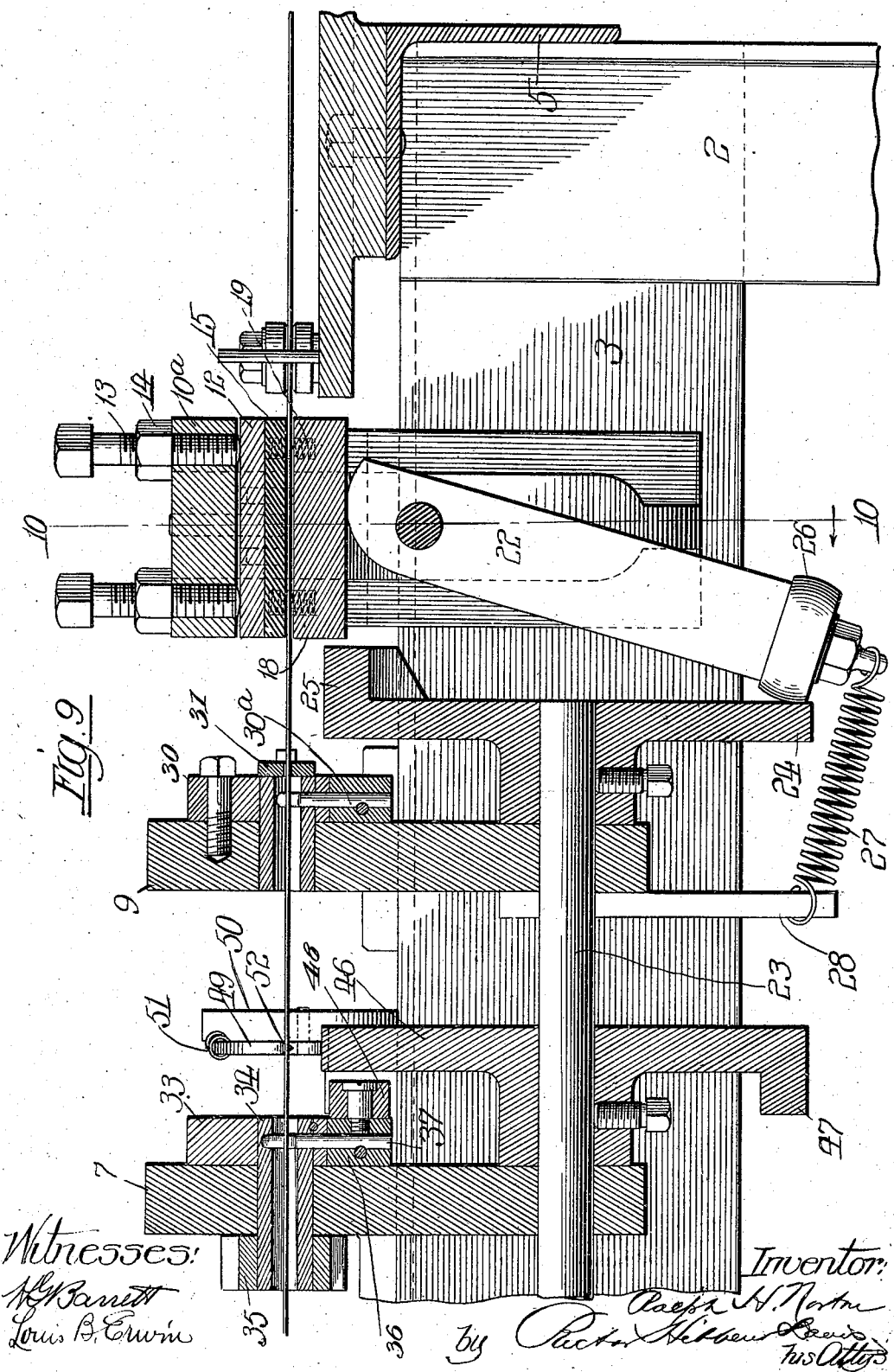

No. 881,611.
PATENTED MAR. 10, 1908.
R. H. NORTON.
MACHINE FOR MAKING TWISTED WIRE BOX STRAPPING.
APPLICATION FILED OCT. 9, 1906.
8 SHEETS—SHEET 6.
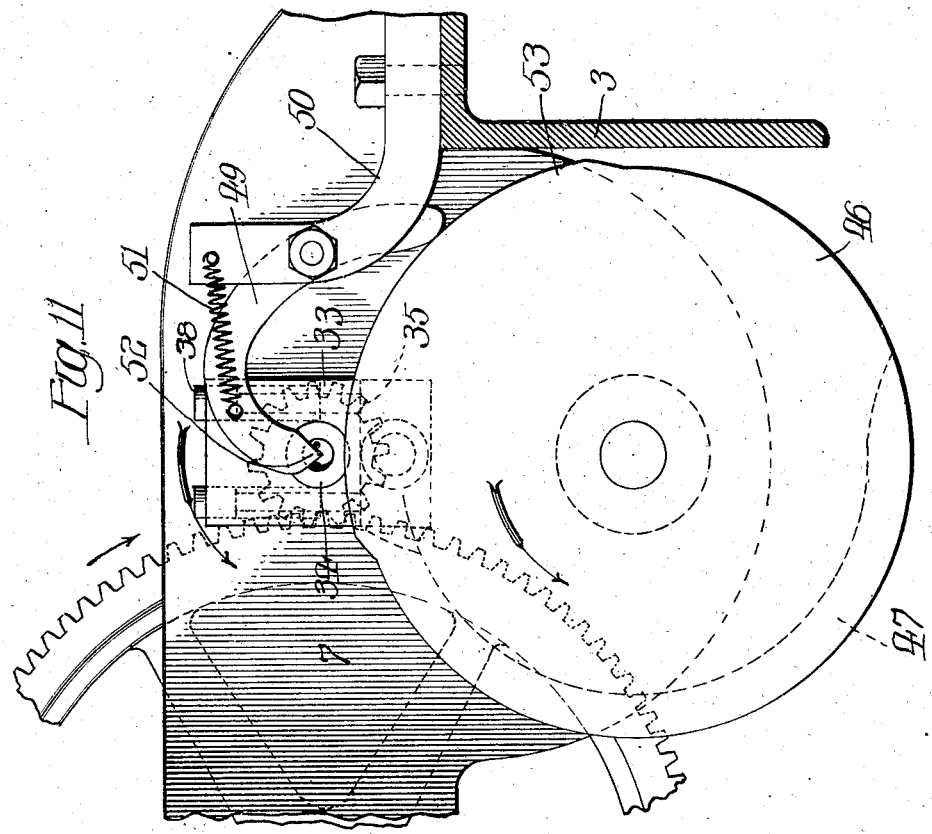

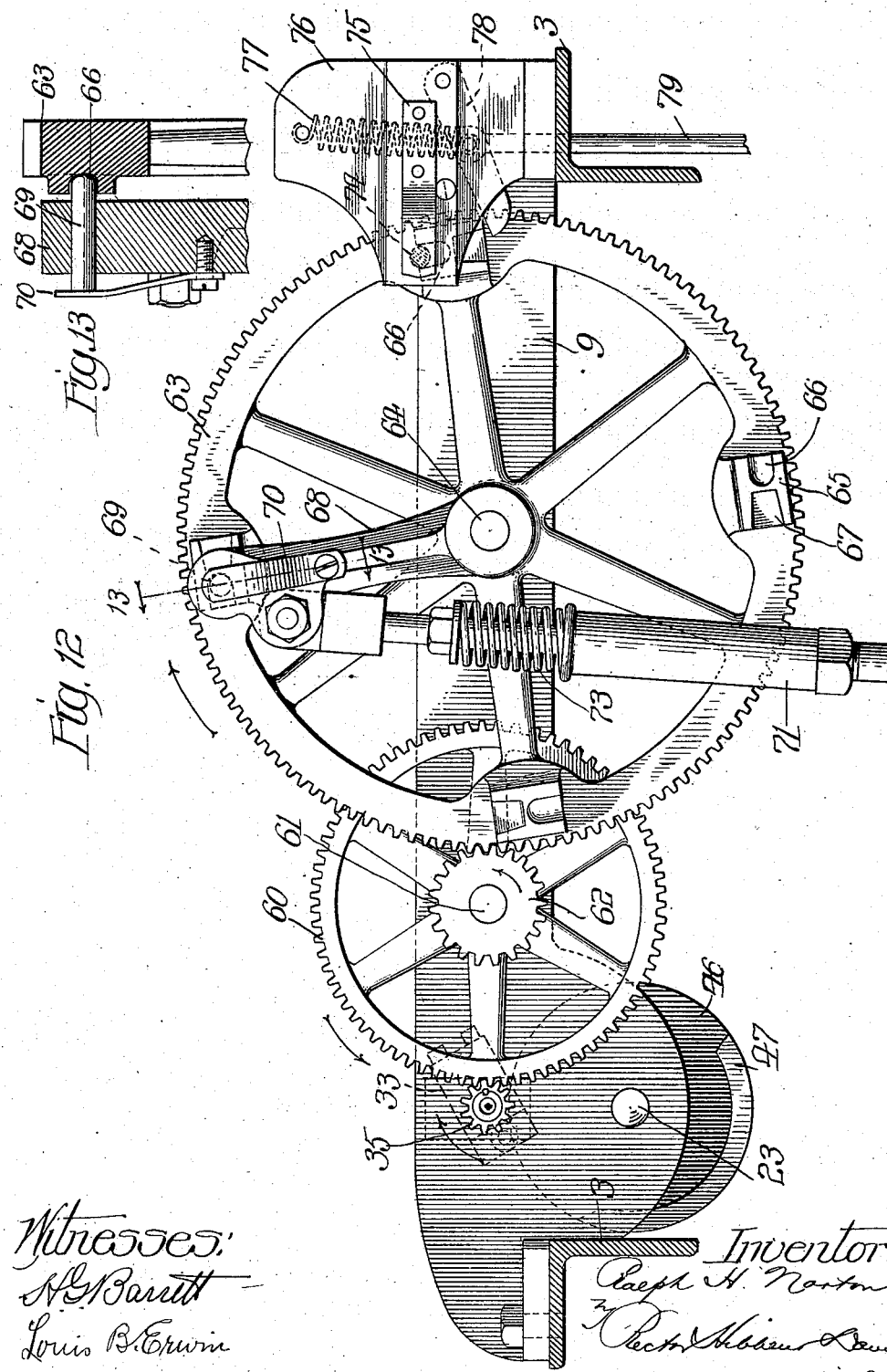

No. 881,611. PATENTED MAR. 10, 1908.
R. H. NORTON.
MACHINE FOR MAKING TWISTED WIRE BOX STRAPPING.
APPLICATION FILED OCT. 9, 1906.
8 SHEETS—SHEET 8.
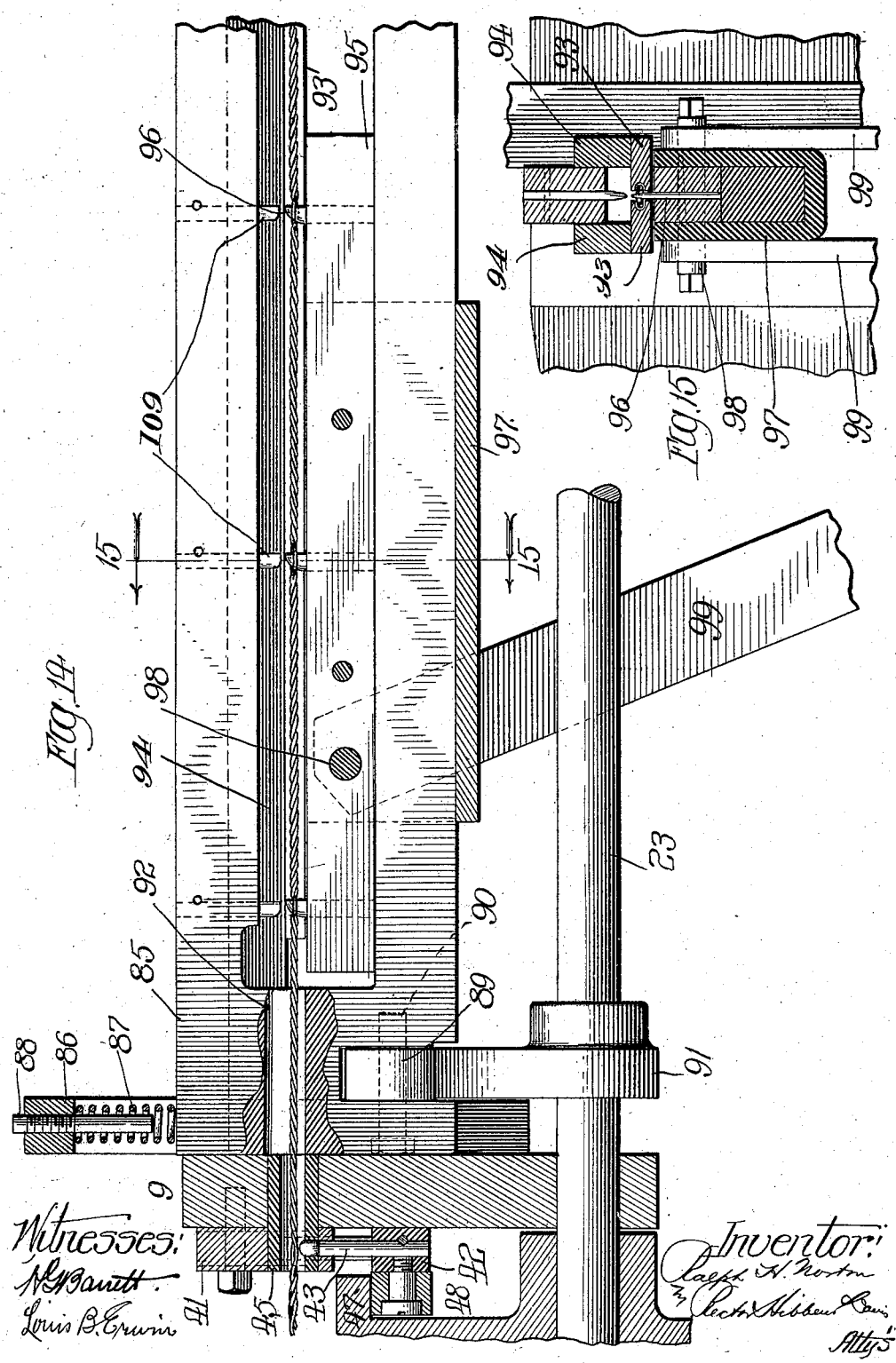

UNITED STATES PATENT OFFICE.

RALPH H. NORTON, OF CHICAGO, ILLINOIS, ASSIGNOR TO ACME FLEXIBLE CLASP COMPANY, OF CHICAGO, ILLINOIS, A CORPORATION OF ILLINOIS.

MACHINE FOR MAKING TWISTED-WIRE BOX-STRAPPING.

No. 881,611.  Specification of Letters Patent.  Patented March 10, 1908.

Application filed October 9, 1906. Serial No. 338,149.

*To all whom it may concern:*

Be it known that I, RALPH H. NORTON, a citizen of the United States, residing at Chicago, in the county of Cook and State of Illinois, have invented certain new and useful Improvements in Machines for Making Twisted-Wire Box-Strapping, of which the following is a specification.

The present invention relates to the production of what is known as twisted wire box strapping and more particularly to that in which the eyes to receive fasteners are formed by reverse twisting whereby each eye is composed of a length of one strand of wire which overlies the same side of the other strand of wire at both ends of the eye so as to lie flat against the box side or other surface in contra-distinction to the manner in which an eye formed without reverse twisting must engage such surface.

The principal object of the present invention is to provide mechanism whereby twisted wire box strapping can be continuously produced with the fastener eyes formed by reverse twisting. This involves, as the invention is here illustrated, the employment of automatically operating feed mechanism whereby a proper length of wire strands will be intermittently advanced, also means for laying two strands parallel and keeping them properly separated, also stakes adapted to enter between the two strands of wire where every other eye is to be formed and also revoluble twisters designed to enter between the two strands of wire at the alternating places where eyes are to be formed. It is proposed to provide for simultaneously forming a considerable number of fastener eyes as a length of twisted wire is produced but of course the invention is not limited in this respect.

With the above stated and incidental objects in view the invention consists in certain novel features of construction and combinations of parts the essential elements whereof are recited in the appended claims and a preferred form of embodiment of which is described in detail hereinafter and fully illustrated in the accompanying drawings forming part of this specification.

Figure 4:
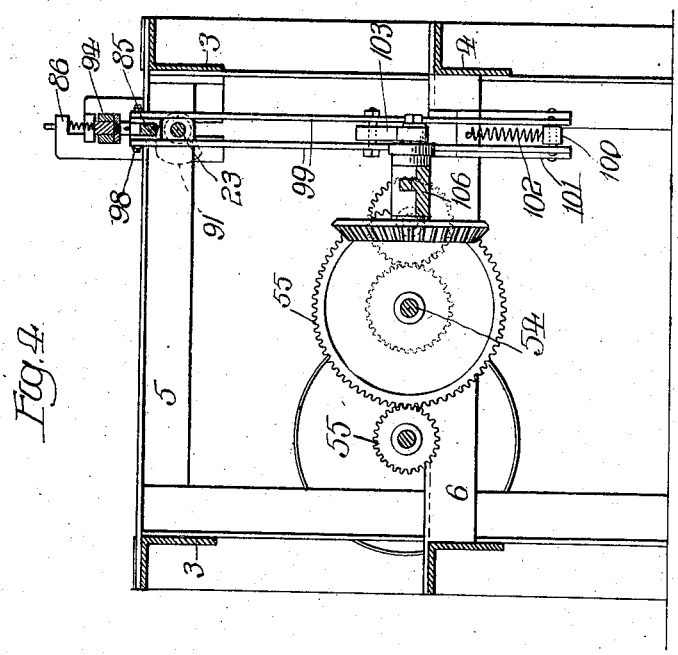
Figure 3:
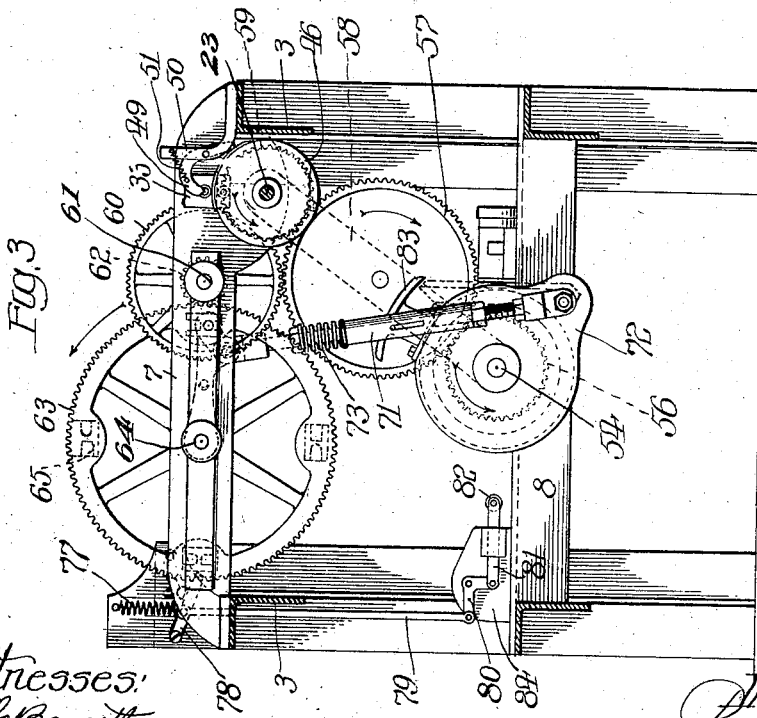

Of said drawings Figure 1 represents in top plan view a machine constructed in accordance with the present invention, two strands of wire being represented as present in the machine ready to be twisted; Fig. 2 represents a vertical longitudinal section of said machine taken on the line 2—2 of Fig. 1 looking in the direction of the arrows crossing said line; Figs. 3 and 4 represent respectively vertical cross-sections taken on lines 3—3 and 4—4 respectively of Fig. 1 looking in the direction of arrows crossing said lines; Fig. 5 represents a fragmentary longitudinal section of the twister heads and a twisted length of wire in association therewith; Fig. 6 represents in perspective on an enlarged scale one of the revoluble twister heads; Fig. 7 represents a vertical section of the same; Fig. 8 is a similar view illustrating the changed relation of parts when the twister tool or blade is withdrawn from between the strands of wire; Fig. 9 represents a fragmentary longitudinal vertical section of the machine including twister heads and a clamp for holding the wire strands while the twisting is in progress; Fig. 10 represents a cross-section on the line 10—10 of Fig. 9; Fig. 11 represents in side elevation one of the spreaders or separators associated with the twister heads, the cam for operating the same and the associated twister head; Fig. 12 represents in side elevation the mechanism for intermittently revolving the tsister heads; Fig. 13 represents a detail of this mechanism in section; Fig. 14 represents part of the said mechanism on an enlarged scale partly in longitudinal section and partly in side elevation; and Fig. 15 represents a cross-section of the same taken on the line 15—15 of Fig. 14 looking in the direction of the arrows crossing said line.

Referring first to Figs. 1 to 4 the various parts of the machine are mounted upon a suitable supporting frame-work comprising uprights, 2, upper longitudinal side-pieces 3, lower longitudinal side-pieces 4, upper and lower end cross-pieces 5 and 6 and upper and lower intermediate cross-pieces 7 and 8, all suitably bolted together to form a rigid frame-work. The upper intermediate cross-pieces 7, of which there are three in the present instance, support the revoluble twister heads and certain gearing for operating the same. Beyond this set of cross-pieces and also between the members of the same there are secured upon the upper side of one upper longitudinal side-piece 3 inwardly extending overhanging arms 9 (see Fig. 1) which support the non-revoluble twister heads. An additional overhanging arm 10 likewise secured to said side-piece 3 supports a clamp near one end of the machine just beyond a wire straightener 11 of any well-known construction adapted to handle two strands of wire, this straightener being secured to one of the upper end cross-pieces 5. The two strands of wire a and b pass from the straightener into the clamp and thence through the line of twister heads as clearly indicated in Fig. 1.

As shown in Figs. 9 and 10 the said clamp comprises an upper block 12 below a flange $10^a$ of the arm 10, adjusting screws 13 entered through said flange to form back-stops for said block, lock-nuts 14 on said screws, a wire-engaging block or strip 15 of suitable frictional material located below said block 12 and permitted a slight lateral rocking movement to properly adjust itself, retaining pins 16 extending through the flange 10 and block 12 and engaging tapered holes 17 in said strip 15, and an underbearing block 18 confronting the strip 15 and designed to be moved toward and from the same to clamp and release the wire, spiral springs 19 being interposed between the blocks 12 and 18 to separate the same when clamping pressure is removed. A plate 20 bolted to the flange $10^a$ serves to complete a guideway for the clamping blocks and strip and also assists in supporting a pivot pin 21 extending between it and the arm 10 and upon which is mounted a cam lever 22 bearing at its upper or cam end against the underside of the lower bearing block 18. A longitudinal shaft 23 is journaled in suitable bearings provided by depending portions of the upper intermediate cross-pieces 7 and by the depending portion of the overhanging arm 9 nearest the clamp and said shaft carries at one end a disk 24 with a laterally projecting cam flange 25 for coöperation with a roller 26 on the lower end of the lever 22, the latter being held toward the disk by a spiral spring 27 secured at one end to the lower extremity of the lever and at the other end to an arm 28 depending from the nearest shaft bearing.

It will be obvious that the above described construction provides for the intermittent opening and closing of the clamp, the cam flange 25 periodically acting against the roller 26, as the shaft 23 revolves. The effect produced by such co-action between the cam flange and said roller is, of course, to force the block 18 upwardly and clamp the wires between it and the friction strip 15, the latter adjusting itself so that the two wires will be correspondingly clamped.

The first of the series of twister heads to receive the wire after it leaves the clamp comprises simply a block 30 bolted to the overhanging arm 9 and apertured for the passage of the wires, and a pin or stake $30^a$ projecting across the aperture to engage between the strands. A plate 31 bolted to the block over the aperture is perforated to receive the two strands of wire lying horizontally as they come from the straightener as illustrated in Fig. 5. The material of the plate 31 is of such character as to withstand wear as is also the material of the pin or stake $30^a$ which stands between the strands of wire marking the end of the length which is to be twisted and incidentally forming one-half of a fastener eye. The overhanging arm 9 is apertured similarly to the block 30 and preferably a short length of tubing 32 lines the apertures. Beyond this fixed twister head and in alinement therewith extends a line of heads alternating in revolubility, there being first a revoluble twister head and then a non-revoluble head and so on. The revoluble heads are all of the same construction so that a description of one will suffice for all and the same may be said as to the non-revoluble heads.

First describing one of the revoluble twister heads the same comprises a block 33 (see Figs. 5 to 9) secured upon one end of a short tubular shaft 34 journaled in the cross-piece 7, said shaft carrying upon its opposite end a pinion 35 by which rotation is imparted to said block. The wire strands pass through the tubular shaft and a second block 36 carries a twisting tool 37 adapted to enter between the wire strands. The block 36 is slidably mounted upon the block 33, being equipped with a pair of plunger rods 38 occupying bores in said block 33 and headed to engage spiral springs 39 which normally hold the two blocks together as illustrated in Fig. 7. The twister tool comprises a round body portion secured in the block 36 by a tapered pin 40 and slidingly engaging a bore in the block 33 and a registering radial bore in the tubular shaft 34. The acting end of this tool is reduced and flattened so as to present a blade for introduction between the wire strands. When the two blocks 33 and 36 are held together by the springs 39 this blade is projected diametrically across the interior of the tubular shaft into a socket thereof as illustrated in Fig. 7 so that the two strands of wire lie on opposite sides of the blade.

It will be seen that rotation of the above described twister head when the twisting tool is so positioned will result in twisting the two strands of wire one upon the other imparting a reverse twist on opposite sides of the tool, provided of course the wire is suitably held on both sides of the tool. The perforated plate 31 and pin or stake $30^a$ heretofore described serve to hold the wires on one side of the nearest revoluble twister head and the wires are held on the opposite side of said head by a non-revoluble twister head of the following description: Blocks 41 and 42, Fig. 14, are related to each other exactly as are the blocks 33 and 36 before described but in this case the upper block is bolted to the overhanging arm 9. The twisting tool 43 does not therefore revolve but operates as a stake to hold the wire strands while being twisted by the revoluble tool heretofore described. By alternating twister heads of the two characters described it will be obvious that the revolution of every other one of them while the twisting tools remain between the wire strands will result in twisting the wire reversely on opposite sides of each revoluble tool and producing such a product as desired in the way of twisted wire box strapping, as perhaps best illustrated in Fig. 5. Of course the twisting tools must be withdrawn from the eyes formed around them, preliminary to the feeding forward of fresh lengths of wire strands. This is the purpose of mounting the tools upon separate blocks slidingly connected with the blocks through which the wire passes. Of course it will be understood that the fixed blocks of the non-revoluble heads are apertured as are likewise the overhanging arms 9 supporting them so that the wire may pass through these parts the same as it passes through the tubular shafts 34, these apertures being preferably lined by short sections of tubing 45. The same shaft 23 which carries the cam disk 24 also carries a series of disks 46 having cam flanges 47 coöperating respectively with rollers 48 upon the several tool-carrying sliding blocks of the twister heads and the moving parts of the machine are properly timed to cause withdrawal of the revoluble and non-revoluble twisting tools simultaneously when the twisting has been completed, these tools being then permitted to return to twisting position when fresh lengths of wire strand have been fed forward.

In order to insure entrance of the twisting tools properly between the wire strands spreaders or separaters are employed in association with each of the twister heads where these tools are employed. Each of these spreaders or separaters is of the same construction so that a description of one will suffice for all.

Referring to Fig. 11 the numeral 49 designates a finger pivoted intermediate its ends to a bracket 50 on the side-piece 3, its upper arm being connected by a spiral spring 51 with said bracket. This upper arm of the finger terminates in a V-shaped portion 52 designed to enter between the wire strands from above and hold the same apart where they enter the twister head. Said spring normally retracts the spreader finger so as to hold it away from the wires but a cam-rise 53 on the periphery of the disk 46 associated with that twister head, by acting against the lower end or tail of the finger 49, rocks it against the stress of the spring and forces its V-shaped extremity between the wires, holding it there during the proper period of time.

The cam shaft 23 runs continuously receiving motion from a power shaft 53 journaled in bearings on lower cross-pieces 6 and 8 at one end of the machine, a counter-shaft 54 journaled in bearings on such cross-pieces and connected with said power shaft by spur gears 55, a spur gear 56 secured to one end of said counter-shaft, an idler 57 meshing with said gear 56 and supported on an inclined brace bar 58 extending between the shafts 54 and 23, and a spur gear 59 on the latter shaft, all as clearly shown in Figs. 1 and 3.

While the cam shaft and cams may rotate continuously, the location and extent of the cam flanges and the relative speed of rotation of the shaft determining the proper periods during which the twisting blades and stakes shall be engaged with or disengaged from the wire, intermittent rotation of the revoluble twister heads is necessary in order to properly limit the amount of twist given the wire and provide a proper interval of rest while the twisting blades and stakes are being withdrawn, the wire fed forward and said blades and stakes re-inserted. To this end the following described driving mechanism is employed. As before stated each twister head is provided with a pinion 35. With each of these pinions meshes one of a set of three gear wheels 60 secured upon a shaft 61 journaled in bearings provided by the upper cross-pieces 7 (see Fig. 1). This shaft also carries a pinion 62 which meshes with a large gear wheel 63 loosely mounted upon another shaft 64 fixed in bearings provided by two of said cross-pieces 7. The large gear wheel 63 is formed on one side at equidistant points with four lugs 65 each formed at one radial side with a socket 66 and at the opposite side with an inclined groove 67 (see Fig. 12). The shaft 64 has journaled upon it an oscillating crank arm 68 carrying a pin 69 at its outer end mounted to slide transversely of the arm and pressed toward the gear wheel 63 by a flat spring 70 (see Figs. 12 and 13). This pin is adapted to engage successively in the sockets 66 for the purpose of advancing the gear wheel a quarter turn at a time. When the quarter turn has been effected and the crank arm 68 retreats this pin 69 rides over the inclined base of the groove 67 in the next lug 65 and then snaps into the socket of that lug. Reciprocations of the crank arm 68 are produced through the medium of a telescopic pitman 71 connecting it with a disk 72 (Fig. 3) secured to the shaft 54, suitable provision being made for adjustment of this pitman longitudinally and a spiral spring 73 being interposed between its members to secure a cushioning effect. In order to provide for laying the eyes of the twisted wire formed by the revoluble twisters horizontally, and also easing the twisters for withdrawal, the large gear wheel 63 in making a quarter turn is caused to over-run slightly and then rebound whereby the twister-heads are carried past their normal vertical position as a twisting operation comes to an end and are then turned back to this vertical position. Rearward turning of the twister gears is limited by a pin 74 (Fig. 12) carried by a flat spring 75 secured to a bracket 76 which is mounted upon the rear longitudinal side-piece 3, this pin 74 being adapted to engage the sockets 66 successively after displacement by the inclined bases of the grooves 67.

As illustrated in Fig. 12 the movement imparted to the gear wheel by the crank arm 68 carries the forward lug 65 far enough ahead so that the extreme outer end of the socket 66 of such lug embraces the pin 74 and the latter is then spaced from the base of the socket. This permits rebound of the gear wheel until the base of the socket comes against the pin and thus the twister heads which had been revolved to the inclined position illustrated in Fig. 12 are restored to the vertical. The rebound of the large gear wheel 63 is effected by means of a stout spiral spring 77 secured at one end to the bracket 76 and at the other end to a tappet arm 78 pivoted to said bracket and protruding across one side of the gear wheel 63 into the line of travel of the lug 66. When the gear wheel is advanced by the crank arm 68 the forward lug strikes this tappet arm 78 and the spring 77 yields but as soon as the crank arm 68 reverses its movement this spring 77 operates to move the twister gears backward. In order to provide for a positive reversal in case the spring 77 should for any reason fail to act, the tappet arm 78 is connected through a link 79 with a bell crank lever 80 (see Fig. 3) which is in turn connected with a plunger bar 81 carrying a roller 82 adapted to be acted upon by a cam shoe 83 secured to the periphery of the disk 72. The plunger bar 81 is arranged in a suitable guide upon a bracket 84 erected on lower cross bar 8 and it is obvious that when thrust back it will convey movement through the bell crank lever 80 and link 79 to the tappet arm 78 and cause the same to drive the twister gears reversely to the desired extent. It will of course be understood that the tappet arm 78 is properly proportioned to provide for its being thrust out of the path of the gear lug when the gear is again advanced by the crank arm 68.

Passing now to the feed mechanism a long bar 85 (see Fig. 14) of rectangular formation extends from the innermost one of the overhanging arms 9 to the delivering end of the machine, being confined at its opposite ends in guiding brackets 86 fixed to the framework of the machine. This rectangular bar is vertically movable in guideways of said brackets but normally depressed by spiral springs 87 inserted between the top of the bar and the upper cross-pieces of the brackets respectively, said springs being confined in position by pins 88 screwing through said cross-pieces. Near its opposite ends the rectangular bar is formed in its under edge with recesses for the reception of rollers 89 revolubly supported upon bolts 90 crossing said recesses. The shaft 23 carries a pair of cams 91 adapted to act upon said rollers respectively and at the proper time elevate the rectangular bar 85 for the purpose of inserting certain feed fingers hereinafter described into the eyes of the length of wire twisted in a previous operation of the machine. The end portions of the bar 85 are longitudinally apertured as at 92 for the passage of the wire and the wire is properly held and guided in its passage through the central open space of said bar by means of confronting grooves in a pair of horizontal strips 93 secured to vertical strips 94 lying on opposite sides of the upper part of the rectangular bar 85 which slides up and down between these vertical strips which are fixedly secured to the frame-work of the machine. The horizontal strips 93 are spaced apart to provide a passage-way for the feed fingers hereinafter described and only the portions of the wire strands forming the eyes engage the confronting grooves of said strips (see Fig. 15).

Within the central open space of the rectangular bar 85 there is arranged a reciprocating feed bar 95 adapted to slide upon the lower part of said rectangular bar. This feed bar carries a series of fingers 96 preferably rounded off to a point, in portions which project above the bar, on sides toward the twisting section of the machine as clearly shown in Fig. 14. These fingers are secured in the feed bar by taper pins or otherwise and in the reciprocations of said bar are designed to advance the wire so as to deliver the completed article and at the same time present fresh lengths of wire strands to be twisted. Of course the engagement of the feed fingers with the eyes of the twisted wire must occur after the feed bar has been restored and must continue during the advance of said bar toward the delivering end of the machine. The introduction of these fingers into and their withdrawal from the eyes of the twisted wire are effected through the vertical movements of the rectangular bar 85 produced as heretofore explained by the conjoint action of the cams 91 and the springs 87. The reciprocations of the feed bar 95 are brought about through the following described means: A saddle 97 straddles the under part of the rectangular bar 85 and the feed bar 95 being pivotally connected with the latter by a cross-pin 98 which also serves to pivotally support the upper ends of a pair of levers 99 located on opposite sides of the saddle and extending downwardly to a point below one of the lower cross-pieces 8 of the machine frame, the lower ends of said levers being jointed to a radius link 100 (Fig. 2). The latter is jointed to an arm 101 depending from said frame cross-piece and a spring 102 connects the outer end of the radius link with an upper portion of said depending arm, all as shown in Fig. 2. A longitudinally adjustable pitman 103 has at one end a slot and pin connection with an intermediate part of the levers 99 and at the opposite end an adjustable connection with a crank arm 104 secured to a shaft 105 which is journaled in suitable bearings upon a bar 106 bolted to the two cross-pieces 8 as shown in Fig. 2. Such shaft carries a beveled gear 107 in mesh with a similar gear 108 on the shaft 54 from which it will be seen that the crank arm 104 will be constantly rotated and through the connections described will reciprocate the feed bar 95. It will be observed that the character of operating connections is such that vertical movement of this feed bar may take place accompanying that of the rectangular bar 85.

In operation two strands of wire having been threaded through the clamp, the twister heads and the rectangular frame 85, the machine is set in motion and the wires clamped securely at the point of entrance into the machine, then the non-revoluble twister stakes and the revoluble twister blades enter between the strands of wire which are properly held apart by the spreader fingers 49, and then the twister gears operate and the wire is twisted by the revolution of the heads carrying said blades. The twist having been completed the revolution of these heads stops, there is a slight reverse movement as hereinbefore explained and all of the twister stakes and blades are withdrawn from engagement with the wire which may then be drawn through the machine so as to bring the twisted portion into the rectangular frame 85 and fresh lengths of strand through the twister heads. The machine will thereupon be ready to operate continuously. After these fresh lengths of strand have been twisted the rectangular frame rises and the feed fingers 96 are engaged with the eyes of the previously twisted length of wire whereupon the feed bar 95 advancing toward the delivering end of the machine carries the wire forward the proper distance. Said rectangular frame then lowers carrying the feed fingers 96 out of the eyes of the twisted wire and then the feed bar 95 returns to its original position ready to have its feed fingers 96 reëngage with the next length of twisted wire. The machine will continue to operate indefinitely to turn out the described product.

In order to securely hold the wire on the delivering side of the machine against longitudinal movement while the twisting is in progress, the rectangular bar 85 carries in its upper side a set of pins 109 which when said bar is lowered are adapted to enter the eyes of the twisted wire as the fingers 86 withdraw from the eyes of the advanced stretch of previously twisted wire. Of course said pins withdraw when the feed bar, after retraction, rises with the rectangular bar and enters its fingers into the eyes of the next stretch of twisted wire.

It will now be seen that the construction described is well adapted to thoroughly fulfil the object primarily stated. At the same time it is to be understood that this construction is susceptible of various modifications within the scope of the invention.

The laying of the eyes horizontally is a feature of considerable importance because this insures a character of twisted wire box strapping in which the eyes can be squarely engaged with the sides of the box or other surface to which the wire is secured—a very desirable feature.

What is claimed is:

1. In a machine of the character described, means for fixedly holding two strands of wire apart at two points and against longitudinal movement, and intermediate means for twisting the strands one upon the other forming an eye with reverse twists on opposite sides of the same while the wire is held against longitudinal movement.

2. In a machine of the character described, means for fixedly holding two strands of wire apart at two points and against longitudinal movement, and a revolving twister entering between the wires at an intermediate point and operating to form an eye while the wire is held against longitudinal movement.

3. In a machine of the character described, the combination of non-revoluble stakes entering between the wires at two points and a revoluble blade entering between the wires at an intermediate point and operating to impart a reverse twist thereto.

4. In a machine of the character described, the combination of non-revoluble stakes entering between the wires at two points, a revoluble blade entering between the wires at an intermediate point and operating to impart a reverse twist thereto, means for engaging the wires with and disengaging them from the stakes and blade, and means for feeding the wire.

5. In a machine of the character described, the combination of non-revoluble stakes entering between the wires at two points, a revoluble blade entering between the wires at an intermediate point and operating to impart a reverse twist thereto, means for intermittently revolving the twisting blade, and means for engaging the wires with and disengaging them from the latter and the non-revoluble stakes.

6. In a machine of the character described, the combination of non-revoluble stakes entering between the wires at two points, a revoluble blade entering between the wires at an intermediate point and operating to impart a reverse twist thereto, means for intermittently revolving the twisting blade, means for engaging the wires with and disengaging them from the latter and the non-revoluble stakes, and means for feeding the wire.

7. In a machine of the character described, the combination of a clamp for the wires, means for periodically opening and closing said clamp, means for fixedly holding two strands of wire apart at two points, and intermediate means for twisting the strands one upon the other forming an eye with reverse twists on opposite sides of the same; the said clamp holding the wire against longitudinal movement during twisting.

8. In a machine of the character described, the combination of a clamp for the wires, means for periodically opening and closing said clamp, means for fixedly holding two strands of wire apart at two points, and a revolving twister entering between the wires at an intermediate point; the said clamp holding the wire against longitudinal movement during twisting.

9. In a machine of the character described, the combination of a clamp for the wires, means for periodically opening and closing said clamp, non-revoluble stakes entering between the wires at two points and a revoluble blade entering between the wires at an intermediate point and operating to impart a reverse twist thereto.

10. In a machine of the character described, the combination of a clamp for the wires, means for periodically opening and closing said clamp, non-revoluble stakes entering between the wires at two points, a revoluble blade entering between the wires at an intermediate point and operating to impart a reverse twist thereto, means for engaging the wires with and disengaging them from the stakes and blade, and means for feeding the wire.

11. In a machine of the character described, the combination of a clamp for the wires, means for periodically opening and closing said clamp, non-revoluble stakes entering between the wires at two points, a revoluble blade entering between the wires at an intermediate point and operating to impart a reverse twist thereto, means for intermittently revolving the twisting blade, and means for engaging the wires with and disengaging them from the latter and the non-revoluble stakes.

12. In a machine of the character described, the combination of a clamp for the wires, means for periodically opening and closing said clamp, non-revoluble stakes entering between the wires at two points, a revoluble blade entering between the wires at an intermediate point and operating to impart a reverse twist thereto, means for intermittently revolving the twisting blade, means for engaging the wires with and disengaging them from the latter and the non-revoluble stakes and means for feeding the wire.

13. In a machine of the character described, a line of wire-receiving heads fixed against movement longitudinally of the wire, said heads being alternately revoluble and constructed to engage between two strands of wire; and means for engaging the wire with and disengaging it from the holding portions of said heads at proper intervals.

14. In a machine of the character described, the combination of a clamp for the wires, means for periodically opening and closing said clamp, and a line of wire-receiving heads fixed against movement longitudinally of the wire, said heads being alternately revoluble and constructed to engage between two strands of wire, and the said clamp arranged to hold the wire from longitudinal movement during twisting.

15. In a machine of the character described, a line of wire-receiving heads fixed against movement longitudinally of the wire, said heads being alternately revoluble and being constructed to engage between two strands of wire; means for engaging the wire with and disengaging it from the holding portions of said heads at proper intervals; and means for intermittently revolving the revoluble heads.

16. In a machine of the character described, a line of wire-receiving heads fixed against movement longitudinally of the wire, said heads being alternately revoluble and constructed to engage between two strands of wire; means for engaging the wire with and disengaging it from the holding portions of said heads at proper intervals; means for intermittently revolving the revoluble heads; and intermittent feed mechanism.

17. In a machine of the character described, a line of wire-receiving heads alternately revoluble and constructed to engage two strands of wire, the engaging portions being spring-held and movable to free the twisted wire for feed purposes, a line of cams for withdrawing said engaging portions of the head, means for intermittently revolving the revoluble heads, and means for feeding the twisted wire.

18. In a machine of the character described, means for fixedly holding two strands of wire apart at two points, a revolving twister entering between the wires at an intermediate point, means for intermittently revolving the twister comprising gears and an oscillating arm to drive the same while moving in one direction.

19. In a machine of the character described, means for fixedly holding two strands of wire apart at two points, a revolving twister entering between the wires at an intermediate point, means for intermittently revolving the twister comprising gears, an oscillating arm to drive the same while moving in one direction and a crank and pitman for operating said arm.

20. In a machine of the character described, means for fixedly holding two strands of wire apart at two points, a revolving twister entering between the wires at an intermediate point, means for intermittently revolving the twister comprising gears, one of which is provided with driving abutments and an oscillating arm having a spring catch to act against said abutments.

21. In a machine of the character described, means for fixedly holding two strands of wire apart at two points, a revolving twister entering between the wires at an intermediate point, means for intermittently revolving the twister comprising gears, an oscillating arm to drive the same while moving in one direction, a crank and pitman for operating said arm and means for returning the gears a limited extent after actuation by said arm.

22. In a machine of the character described, means for fixedly holding two strands of wire apart at two points, a revolving twister entering between the wires at an intermediate point, means for intermittently revolving the twister comprising gears, an oscillating arm to drive the same while moving in one direction, a crank and pitman for operating said arm, means for returning the gears a limited extent after actuation by said arm and a movable stop to limit the return movement.

23. In a machine of the character described, means for fixedly holding two strands of wire apart at two points, a revolving twister entering between the wires at an intermediate point, means for intermittently revolving the twister comprising gears, an oscillating arm to drive the same while moving in one direction, a crank and pitman for operating said arm, spring means for returning the gears a limited extent after actuation by said arm and a movable stop to limit the return movement.

24. In a machine of the character described, means for fixedly holding two strands of wire apart at two points, a revolving twister entering between the wires at an intermediate point, means for intermittently revolving the twister comprising gears, one of which is provided with driving abutments, an oscillating arm having a spring catch to act against said abutments, and a spring-held buffer standing normally in the path of movement of the abutments on the gear and adapted to be partially displaced as the same arrives at the end of a throw, and to then return the gears to a limited extent.

25. In a machine of the character described, means for fixedly holding two strands of wire apart at two points, a revolving twister entering between the wires at an intermediate point, means for intermittently revolving the twister comprising gears, an oscillating arm to drive the same while moving in one direction, a crank and pitman for operating said arm and means for positively returning the gears a limited extent after actuation by said arm.

26. In a machine of the character described, means for fixedly holding two strands of wire apart at two points, a revolving twister entering between the wires at an intermediate point, means for intermittently revolving the twister comprising gears, an oscillating arm to drive the same while moving in one direction, a crank and pitman for operating said arm, spring means for returning the gears a limited extent after actuation by said arm and means for positively returning the gears a limited extent.

27. In a machine of the character described, means for fixedly holding two strands of wire apart at two points, a revolving twister entering between the wires at an intermediate point, means for intermittently revolving the twister comprising gears, one of which is provided with driving abutments, an oscillating arm having a spring catch to act against said abutments, a spring-held buffer standing normally in the path of movement of the abutments on the gear and adapted to be partially displaced as the same arrives at the end of a throw, and to then return the gears to a limited extent, and means for positively actuating the buffer.

28. In a machine of the character described, the combination of means for fixedly holding wire strands spread apart at separated points, and an intermittently revolving twister entering between the strands intermediate said points, with provisions for limited reverse movement of the twister to provide for properly disposing the eye and withdrawing the twister.

29. In a machine of the character described, the combination of means for fixedly holding wire strands spread apart at separated points, an intermittently revolving twister entering between the strands intermediate said points, a separator adjacent the twister movable into and out of engagement with the wire strands, and means moving said separator into engagement therewith when the twister is withdrawn.

30. In a machine of the character described, the combination of a feed bar with one or more projections to engage eyes of the twisted wire, means for moving said bar to enter and withdraw said projections and means for reciprocating the bar longitudinally.

31. In a machine of the character described, the combination with means for twisting wire strands together and forming eyes at intervals therein, of feed mechanism comprising a bar movable crosswise and longitudinally of the wire and carrying fingers or projections for entering the eyes of the twisted wire, means for imparting crosswise movement to said bar to engage and disengage said projections, and means for imparting longitudinal movement to said bar to advance the wire.

32. In a machine of the character described, the combination of a clamp, a line of wire twisting heads alternately revoluble and non-revoluble and each composed of separable parts spring-held together one carrying a stake or blade to enter between wire strands, a feed-bar movable cross-wise and longitudinally of the wire and having fingers or projections to engage the eyes formed by the twisting stakes and blades, a shaft carrying cams for closing the clamp, withdrawing the twister stakes and blades and moving the feed-bar crosswise the wire, gearing for intermittently revolving the revoluble twister heads, and means for reciprocating the feed-bar longitudinally.

33. In a machine of the character described, the combination with means for twisting wire strands together and forming eyes at intervals therein, of feed mechanism comprising a rectangular bar movable crosswise the wire, means for intermittently so moving it, a feed-bar mounted to reciprocate longitudinally in the rectangular bar and having fingers or projections to engage the eyes of the twisted wire, and means for reciprocating said feed bar.

34. In a machine of the character described, the combination of a feed-bar with one or more projections to engage eyes of the twisted wire, means for moving said bar to enter and withdraw said projections, means for reciprocating the bar longitudinally, and a wire guideway with which engage those portions of the wire strands forming the eyes in the twisted wire.

35. In a machine of the character described, the combination of a feed-bar with one or more projections to engage eyes of the twisted wire, means for moving said bar to enter and withdraw said projections, means for reciprocating the bar longitudinally, and a wire guideway composed of strips between which said feed projections travel, said strips having confronting grooves receiving those portions of the wire strands which form the eyes in the twisted wire.

36. In a machine of the character described, the combination with means for twisting wire strands together and forming eyes at intervals therein, of feed mechanism comprising a rectangular bar movable crosswise the wire, means for intermittently so moving it, a feed-bar mounted to reciprocate longitudinally in the rectangular bar and having fingers or projections to engage the eyes of the twisted wire, means for reciprocating said feed-bar, and a wire guideway with which engage those portions of the wire strands forming the eyes in the twisted wire.

37. In a machine of the character described, the combination with means for twisting wire strands together and forming eyes at intervals therein, of feed mechanism comprising a rectangular bar movable crosswise the wire, means for intermittently so moving it, a feed-bar mounted to reciprocate longitudinally in the rectangular bar and having fingers or projections to engage the eyes of the twisted wire, means for reciprocating said feed bar, and a wire guideway composed of strips between which said feed projections travel, said strips having confronting grooves receiving those portions of the wire strands which form the eyes in the twisted wire.

38. In a machine of the character described, means for fixedly holding two strands of wire apart at two points, a revolving twister entering between the wires at an intermediate point, and means for intermittently revolving the twister comprising gears and an oscillating arm to drive the same while moving in one direction, with provisions for limited reverse motion of the gears, substantially as and for the purpose described.

39. In a machine of the character described, means for fixedly holding two strands of wire apart at two points, a revolving twister entering between the wires at an intermediate point, and means for intermittently revolving the twister comprising gears, an oscillating arm to drive the same while moving in one direction and a crank and pitman for operating said arm, with provisions for limited reverse motion of the gears, substantially as described.

40. In a machine of the character described, the combination of a feed bar having one or more projections to engage eyes of the twisted wire, means for moving said bar to enter and withdraw said projections, means for reciprocating the bar longitudinally, and a bar movable crosswise of the wire and having one or more projections to engage the eyes thereof, when the projections of the first mentioned bar is withdrawn.

41. In a machine of the character described, the combination with means for twisting wire strands together and forming eyes at intervals therein, of feed mechanism comprising a rectangular bar movable crosswise of the wire and having one or more projections for engaging the eyes thereof, means for intermittently so moving said bar, a feed bar mounted to reciprocate longitudinally in the rectangular bar, and having fingers or projections to engage the eyes of the twisted wire, and means for reciprocating the feed bar.

42. In a machine of the character described, the combination with means for twisting wire strands together and forming eyes at intervals therein, of feed mechanism comprising a rectangular bar movable crosswise the wire and having one or more projections for engaging the eyes thereof, means for intermittently so moving said bar, a feed bar mounted to reciprocate longitudinally in the rectangular bar and having fingers or projections to engage the eyes of the twisted wire, means for reciprocating said feed bar, and a wire guideway with which engage those portions of the wire strands forming the eyes in the twisted wire.

43. In a machine of the character described, the combination with means for twisting wire strands together and forming eyes at intervals therein, of feed mechanism comprising a rectangular bar movable crosswise the wire, having one or more projections for engaging the eyes thereof, means for intermittently so moving said bar, a feed bar mounted to reciprocate longitudinally in the rectangular bar and having fingers or projections to engage the eyes of the twisted wire, means for reciprocating the feed bar, and a wire guideway composed of strips between which said feed projections travel, said strips having confronting grooves receiving those portions of the wire strands which form the eyes in the twisted wire.

RALPH H. NORTON.

Witnesses:
F. P. DAVIS,
SYLVIA BLISS.